United States Patent
Cavanagh et al.

(10) Patent No.: US 9,014,436 B2
(45) Date of Patent: Apr. 21, 2015

(54) SYSTEMS AND METHODS FOR APPLYING COMMERCIAL WEB SEARCH TECHNOLOGIES TO BIOMETRIC MATCHING AND IDENTIFICATION

(71) Applicant: Lockheed Martin Corporation, Bethesda, MD (US)

(72) Inventors: Mark Kevin Cavanagh, Orlando, FL (US); David Wayne Hagan, Orlando, FL (US); Christopher Thomas Richardson, Oviedo, FL (US); Gregory Adam Royal, Wheat Ridge, CO (US); Steven Frederick Venable, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 60 days.

(21) Appl. No.: 13/952,691

(22) Filed: Jul. 29, 2013

(65) Prior Publication Data

US 2015/0030212 A1 Jan. 29, 2015

(51) Int. Cl.
*G06K 9/00* (2006.01)

(52) U.S. Cl.
CPC .................................. *G06K 9/00885* (2013.01)

(58) Field of Classification Search
CPC ........................................................ G26K 9/00
USPC ........................................................ 382/115
See application file for complete search history.

(56) References Cited

U.S. PATENT DOCUMENTS

| | | | |
|---|---|---|---|
| 6,758,394 B2 | 7/2004 | Maskatiya et al. | |
| 6,920,231 B1 * | 7/2005 | Griffin .......................... | 382/115 |
| 7,225,338 B2 | 5/2007 | Khan et al. | |
| 7,308,708 B2 | 12/2007 | Blume | |
| 7,929,732 B2 | 4/2011 | Bringer et al. | |
| 8,031,981 B2 | 10/2011 | Peirce | |
| 8,041,956 B1 | 10/2011 | White et al. | |
| 2001/0048025 A1* | 12/2001 | Shinn ............................ | 235/382 |
| 2007/0126551 A1* | 6/2007 | Slevin .......................... | 340/5.53 |
| 2010/0174914 A1* | 7/2010 | Shafir .......................... | 713/186 |
| 2011/0071826 A1* | 3/2011 | Ma et al. ....................... | 704/235 |
| 2011/0188709 A1 | 8/2011 | Gupta et al. | |
| 2011/0188713 A1 | 8/2011 | Chin et al. | |
| 2011/0246196 A1 | 10/2011 | Bhaskaran | |
| 2012/0239940 A1 | 9/2012 | Chabanne et al. | |

FOREIGN PATENT DOCUMENTS

JP A-01-228084 9/1989

* cited by examiner

*Primary Examiner* — Stephen R Koziol
*Assistant Examiner* — Delomia Gilliard
(74) *Attorney, Agent, or Firm* — Ronald E. Prass, Jr.; Prass LLP

(57) ABSTRACT

A system and method are provided for implementing a scheme to apply commercial web search technologies to biometric matching and identification based on converting biometric identification data to one or more text strings. Collected biometric identification information regarding particular physical traits is converted to a form that facilitates application of commercial Web search technologies to implement biometric matching and identification. A scalability of multi-modal biometric identification systems is maintained while substantially eliminating reliance on proprietary matchers and templates in support of interoperability and customer satisfaction. Separate biometric templates are converted into strings of searchable text in any combination of alpha-numerics during a standard biometric data enrollment process in order to limit the data storage requirements and streamline the later undertaken comparison process.

19 Claims, 3 Drawing Sheets

SYSTEMS AND METHODS FOR APPLYING COMMERCIAL WEB SEARCH TECHNOLOGIES TO BIOMETRIC MATCHING AND IDENTIFICATION

BACKGROUND

1. Field of the Disclosed Embodiments

This disclosure relates to systems and methods for implementing a scheme to apply commercial web search technologies to biometric matching and identification by converting collected biometric identification information for one or more individual users to text strings.

2. Related Art

The terms "biometrics," "biometric identification," and "biometric authentication" refer generally to a series of techniques that are employed to identify humans according to certain physical characteristics or traits. Biometric identification schemes may be used to catalogue databases of physical characteristics and traits for a select user population to be employed in any one of a broad array of identification, access control and/or other security scenarios, including law enforcement identification of one or more persons under surveillance.

Various common biometric identification schemes isolate various individual physical identifiers that represent collectible and differentiable physical characteristics as a means to mark individual humans. Biometric identification schemes may collect various biometric identifiers including, but not limited to, fingerprints, palm prints, hand or foot geometries, iris and retinal scans, facial or overall body mapping, and/or DNA. Biometrics generally focus on substantially static physical traits as opposed to behavioral characteristic monitoring that seeks to isolate trends in bodily movement or bodily response to stimuli including monitoring an individual's pulse rate, pupillary response, physical movement and/or voice.

Biometric identification schemes are gaining wide acceptance as methods to replace traditional access authorization means that generally included (1) presentation of some specified identification card or identifiably coded device (including injectable devices) for visual or electronic inspection; and/or (2) employment of an active or passive challenge/reply system including varying types of passwords, query responses and/or other individual knowledge-based identifiers selected by an individual user or an administrator for identification of the individual user.

The particularly unique nature of individual human biometric identifiers renders their use substantially more reliable in verifying an individual user's identity based on the substantial elimination of the potential to copy, counterfeit or otherwise reproduce the identifying biometric trait. Identification cards or devices can be copied or stolen. Individual passwords or other knowledge-based identifiers can be stolen, replicated or surmised. In this manner unauthorized individuals may be able to gain access to "protected" systems, data, physical spaces or equipment. The relative non-reproducibility of biometric identification information has proven to provide substantial advantages in certain security and access control schemes. This significant advantage is, however, largely balanced by current cumbersome methods for collection of biometric identification information and for the large computer storage overhead required to store detailed biometric identification information. Further, based on its individually unique nature, storage of raw or even descriptive biometric identification information raises privacy and other concerns disadvantageously affecting its use on an even broader scale.

The selection of a particular biometric identification scheme is often driven by the above-mentioned "other" concerns. Books have been written on selection criteria for a particular biometric identifier for use in a particular biometric identification scheme. See, e.g., A. K. Jain et al., *Biometrics: Personal Identification in Networked Society*, Kluwer Academic Publications (1999) (identifying factors for assessing the suitability of any particular biometric identifier). The widely-accepted factors include: (1) Universality in that every person using a system possesses the particular biometric identifier; (2) Uniqueness in that the biometric identifier is sufficiently differentiable among the population of individual users; (3) Permanence in that the biometric identifier is sufficiently static over time such that recurring updates of baseline or comparative information do not need to be undertaken; (4) Ease of acquisition or measurement in that the biometric identifier is relatively easily (and non-intrusively) collectible; (5) Sortability in that the data by which the acquired biometric identifiers are catalogued may be in a form that facilitates rapid and accurate comparison; (6) Willingness of individuals in the user population to accept the technology; and (7) Robustness against schemes that may be employed to circumvent the biometric identification scheme to gain unauthorized access by replicating a particular biometric identifier for a particular individual user.

Those of skill in the art recognize that no single biometric identifier may sufficiently meet all of the above-enumerated requirements for any particular biometric identification scheme or any particular user population. As a result, combinations of biometric identification schemes may be employed to maximize the advantages while minimizing the disadvantages to a particular organization, entity, system or network requirement.

Generally, individual users may be "enrolled" in a particular biometric identification scheme by collection and recordation of one or more individual biometric identifiers that will be captured and stored in association with identification information/data for the individual users. In use, then, biometric identification information for an individual user seeking access will be detected (normally, with reference to one or more sensors or image acquisition systems) and normalized (if appropriate). Relevant features for comparison may then be extracted from the captured image data and compared with the stored information according to some comparison algorithm or scheme, to authorize or deny the access sought by the individual user.

With the proliferation of biometric identification schemes as preferred techniques for individual identification, security screening and access control, individual entities may piece together systems that were never intended to be combinable into increasingly sophisticated "multi-modal" biometric systems. Multiple sensors or biometric imagers may be employed in what appears to the individual user to be a substantially cooperative manner in an effort to overcome limitations that may be introduced based on over-reliance on any individual biometric identification system modality. Individual biometric identification systems may be limited by the integrity of both the biometric identifier and imaging system and/or sensor used to image the biometric identifier. The overlap provided in the multi-modal systems tends to mediate these limitations based on the improbability that the multiple individual biometric identification systems that are brought together to comprise the multi-modal biometric system will suffer from substantially similar limitations. It should be noted that, in the context of this disclosure, the term "multi-modal biometric systems" and variations of that term will generally be understood to include systems that (1) obtain separate sets of information regarding the same physical trait of an individual, e.g., multiple images of an iris or scans of a same finger; (2) obtain separate information regarding a plurality of physical traits of the individual, e.g., a fingerprint scan and an iris scan; or (3) combinations of the two. The integration between "scans" may be undertaken sequentially, simultaneously, in series and/or in parallel.

SUMMARY OF THE DISCLOSED EMBODIMENTS

Current multi-modal biometric systems are generally implemented and fielded using a non-optimized combination of several, often proprietary, individual biometric identification systems, schemes, methods and technologies that were never developed for integration. Individual commercial vendors may attempt to provide some level of integration between separate systems resulting in ever more complex, increasingly proprietary, limitedly optimized and progressively more expensive architectures, which may require labyrinth-like licensing schemes.

In view of these shortfalls in currently-fielded "multi-modal" biometric identification systems, it would be advantageous to provide systems and methods for implementing true multi-modal biometric identification in a manner that reduces the cost and complexity of the multi-modal biometric identification systems, and reduces the intricacy of the licensing schemes supporting their use.

Exemplary embodiments of the systems and methods according to this disclosure may convert collected biometric identification information regarding particular physical traits for individual users in a particular user population to a form that facilitates application of commercial Web search technologies to implement biometric identification.

Exemplary embodiments may encode extracted features from input images of particular biometric characteristics (biometric templates) as text strings such that matching can be performed by a single search engine. The text strings are not intended to be descriptive of the biometric characteristics, nor are they human readable in order to address security, privacy and other concerns.

Exemplary embodiments may leverage capabilities and investments made by the text-based search industry to simplify biometric identification system architectures through the employment of known and commercially-available text-based search engines.

Exemplary embodiments may maintain scalability of multi-modal biometric identification systems while substantially eliminating reliance on proprietary matchers and templates in support of interoperability between separate modalities and enhanced customer/user satisfaction.

Exemplary embodiments may specifically convert separate biometric templates into strings of searchable text using any combination of alpha-numerics during a standard biometric data enrollment process in order to limit the resultant data storage requirements and to streamline the later undertaken comparison process using a text-based search engine.

Exemplary embodiments may index a plurality of strings of searchable text as biometric text-templates for several biometric identities/identifiers for searching. In embodiments then, searches may be performed against stored database information and entries representing one or more indexed galleries of biometric identifiers for an individual user or group of individual users by converting a search biometric sample that may be received (and normalized, as required) from one or more imaging systems or sensors into a text-template for comparison. The text-template representing the search biometric sample may then be submitted as a query to an available search engine that may, in turn, return a ranked list of determined matches based on a text only comparison.

Exemplary embodiments may convert to text strings one or more of facial recognition, fingerprint impressions, iris scans, DNA profiles, and the like for use by one or more available commercial search engines to perform the comparison in support of a biometric identifier based security, identification or access control scheme.

Exemplary embodiments may convert biometric data to a uniquely simple form usable by a commercial text search technology in a manner that avoids the commonly understood and implemented model of non-optimally integrating individual proprietary biometric trait matchers from a variety of vendors while reducing cost and architectural complexity.

Exemplary embodiments may employ familiar common search engine paradigms to reduce the learning curve for exploiting the advantages of the multi-modal biometric identification schemes.

Exemplary embodiments may provide a scheme by which to easily combine biometric identification with other text-based information in support of personnel identification, security and access requirements.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing a scheme to apply commercial web search technologies to biometric matching and identification, will be described, in detail, with reference to the following drawings, in which.

DETAILED DESCRIPTION OF THE DISCLOSED EMBODIMENTS

Figure 1:
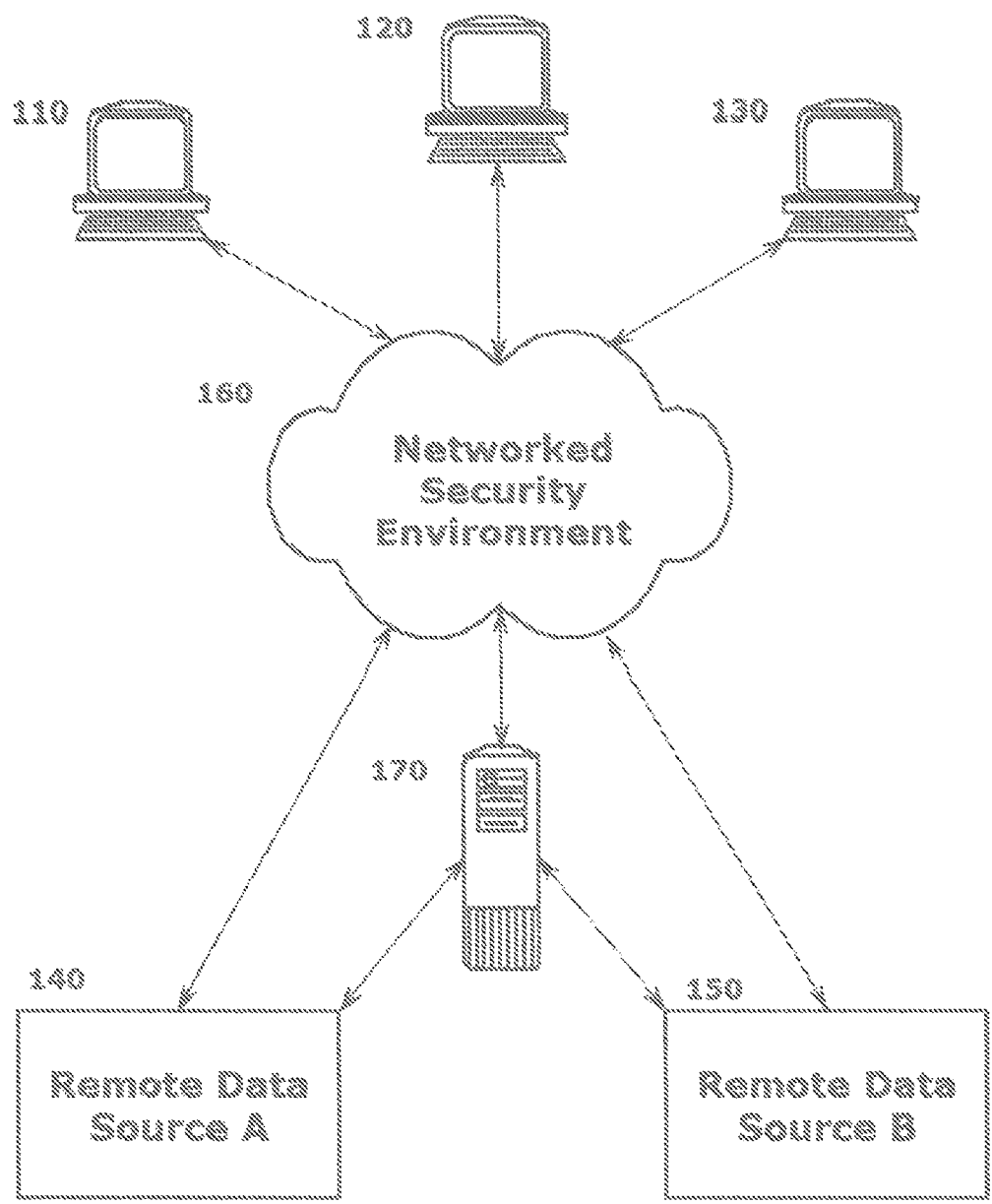
FIG. 1 illustrates a schematic diagram of an exemplary embodiment of a network environment within which a biometric identification scheme for security and/or access control may be implemented using the systems and methods according to this disclosure.

The disclosed systems and methods for implementing a biometric identification scheme for security and/or access control will generally refer to this specific utility for those systems and methods. Exemplary embodiments described and depicted in this disclosure should not be interpreted as being specifically limited to implementation in any particular physically-controlled secure space or in any particular system architecture including access controls, or otherwise as being directed to any particular biometric identifier or any particular physical trait for an individual used in biometric identification. Any biometric identification scheme, particularly a multi-modal biometric identification scheme or a scheme that combines biometric and knowledge-based identifiers, that may advantageously employ the text string conversion and comparison schemes according to this disclosure for individual user identification, security, and/or access control with respect to systems, networks, spaces, equipment and the like is contemplated.

Specific reference to, for example, any particular computing or communicating device should be understood as being exemplary only, and not limited, in any manner, to any particular class of devices. The systems and methods according to this disclosure will be described as being particularly adaptable to being hosted on network connected workstations and the like, but should not be considered as being limited to only such devices.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to systems and methods for converting separate biometric templates into strings of searchable text in any combination of alpha-numerics during a standard biometric data enrollment process according to a specified translation technique, algorithm or scheme in order to enhance security of the collected data while limiting the data storage requirements and streamlining the later undertaken comparison process. A plurality of thus-generated strings of searchable text representative of the plurality of biometric text-templates for several biometric identities/identifiers are indexed in, for example, stored databases for searching. Searches may be performed against the stored database information and entries representing one or more indexed galleries of biometric identifiers for an individual user or group of individual users by converting a search biometric sample that may be received (and normalized, as required) from one or more imaging systems or sensors into a text-template. The text-template representing the search biometric sample may then be submitted as a query to an available search engine that may, in turn, return a ranked list of determined matches based on a text only comparison. The specified translation technique, algorithm or scheme may convert to text strings one or more of facial recognition, fingerprint impressions, iris scans, DNA profiles, and the like for use by one or more available commercial search engines to perform the comparison in support of a biometric security, identification or access control scheme.

FIG. 1 illustrates a schematic diagram of an exemplary embodiment of a network environment within which a biometric identification scheme for security and/or access control may be implemented using the systems and methods according to this disclosure. As shown in FIG. 1, a plurality of access/identification stations 110-130 may be provided. Although depicted in FIG. 1 as what appear to be individual user workstations, no particular configuration to the access/identification stations 110-130 is intended to be implied by the depiction. Access/identification stations 110-130 may include, for example, access devices associated with locked or otherwise secured entrances to particular spaces, which may be located in the vicinity of, or otherwise directly adjacent to, the secured entrances. Access/identification stations 110-130 may otherwise be configured as fixed or mobile user workstations that are protected by access/identification features that are compatible with the biometric identification schemes according to this disclosure. Access identification stations 110-130 may separately be configured as systems or devices that may prevent operation of particular equipment until an identification of a user requesting operation of that particular equipment is "cleared" according to the disclosed biometric identification schemes.

Access/identification stations 110-130 may have associated with them one or more biometric sensors in order to obtain biometric information from an individual user requesting identification, access to particular data, and/or permission to operate a particular system, device or piece of equipment. Biometric data obtained via the biometric sensors associated with the access/identification stations 110-130 may be converted to text strings according to the disclosed methods and compared to stored text strings representing previously-collected biometric information regarding an approved and/or authorized user population.

Access/identification stations 110-130 may communicate with other components of an overall identification, access, and/or authorization system via a networked security environment 160. Via the networked security environment 160, the individual access/identification stations 110-130 may communicate, for example, with a plurality of remote data sources A/B 140,150. These remote data sources A/B 140,150 may represent, for example, repositories of collected identification information, including biometric identification information, for particular individuals or classes of individuals. Access to the remote data sources A/B 140,150, to include copying of files including identification information and biometric identification information regarding any particular individual will be according to prevailing laws governing such access. Information gathered from remote data sources A/B 140,150 as it may pertain to a local user population may be stored in a local server 170 for ready access and for executing the disclosed comparison schemes. It is intended that all of the biometric identification information regarding one or more individual users in the local user population will be converted to, and stored as, text strings according to the disclosed methods.

The first time that an individual user seeks to be identified by the system, to gain access to secure data or to a secure space, or to operate "protected" equipment, may require the individual user to execute a start-up scheme for pre-processing of user identification information for the individual in a variation of a conventional enrollment scheme. Via one of the access/identification stations 110-130, the individual user that is not previously registered may be requested to provide certain identifying information. Generally, this information may be textual and include, for example, the user's name, address and phone number(s), government-issued identification numbers (including one's Social Security number, valid driver's license number, passport identification number, or other like identification number), date of birth, and/or descriptive information regarding basic physical characteristics including, for example, height, weight, hair color, eye color and/or identification of any non-removable bodily distinguishing marks.

The user may then be prompted to authorize the system via the one of the access/identification stations 110-130 to communicate with one or more remote data sources A/B 140,150 to obtain biometric information that may have been previously collected and/or stored by one or more agencies, organizations, or entities. A request to obtain remotely-stored biometric information may include identifying information provided by the individual user. Recovery and verification (by the system autonomously, or in conjunction with further individual user input) of previously collected and/or stored biometric information for the individual user may preclude a requirement for additional real-time collection of further biometric information on the individual user employing the one or more biometric sensors associated with the access/identification stations 110-130. Otherwise, the user may be requested to provide biometric information and/or images at the time of enrollment using the one or more biometric sensors associated with the access/identification stations 110-130. No particular limitation is implied to the manner by which the biometric information from an individual user may be captured for processing during the enrollment phase. In fact, the biometric sensors associated with the access/identification stations 110-130 may not necessarily be sophisticated biometric sensors for real-time imaging of a particularly-identified biometric traits of the individual user, but rather may consist of no more than a flat plate image scanner by which the individual user may scan for upload images of pictures taken of the user, fingerprint images on a fingerprint card previously provided by the user, user writing sample(s) or the like.

Once obtained, whether via data transfer from a remote data source A/B 140,150, or via real-time collection via the access/identification station 110-130 at the time of enrollment, the biometric information for the individual user will be converted to one or more text strings. Each of these one or more text strings for the biometric information of the individual user may then be stored in association with the other textual-type identification information provided by the individual user in the manner described above in an accessible local server 170, or other data storage component.

In subsequent uses, a particular biometric characteristic of the user seeking access may be detected by one or more biometric sensors associated with the access/identification stations 110-130. The particularly-detected biometric characteristic information may then be normalized (as required) and converted to a text string. This conversion may occur locally at the access/identification station 110-130, may occur in the local server 170, or may, for example, be remotely undertaken by an external server or remote application (including a cloud-based application). The text string representing the particularly-detected biometric characteristic information may then be compared to each of the one or more text strings for the biometric information on individual users previously obtained and stored for such use. Again here, the particular location of the scheme or application by which the comparison is undertaken is not particularly limited to any actual or virtual, local or remote server or system component.

It should be understood that the storage and retrieval will be undertaken at a level of security and access control at least as high as that required for the biometric access identification scheme. The use of non-human readable text strings that are in no way easily discernible by a human reader as being descriptive of the particular biometric identifier support this objective.

The conversion scheme will generally be limited to particular features of the biometric characteristic that are extracted for conversion in the manner that conventional systems select particular properties from an image to generate a template, which is generally understood to comprise a synthesis of the relevant characteristics extracted from the source image.

It is anticipated that the disclosed systems may operate in one of a number of identification schemes. In, for example, what may be referred to as a verification scheme, the system may perform a one-to-one comparison of the text string representing the particularly-detected biometric characteristic information with an entry in the stored database of text strings based on an initial individual user textual identification of his or her identity via the access/identification stations 110-130. Identification may be verified, and/or access may be authorized, based on the results of this comparison. Separately, in what may be referred to as an identification scheme, the system may collect the particularly-detected biometric characteristic information of the individual user, convert it to a text string, and perform a one-to-many comparison against the stored database of text strings. As indicated above, the stored database of text strings indexes the biometric text-templates for several individuals in a particular user population for searching. Searches are performed against the indexed stored database of text strings (galleries), once the particularly-detected biometric characteristic information is converted into a compatible text-template, by submitting that text-template as a query to a text-based search engine. The search engine may then return a ranked list of matches that are deemed to be "close to" the text string representing the particularly-detected biometric characteristic information for further comparison. A particular threshold may be established such that when one or more of the stored text-strings match, within specified parameters, the text string representing the particularly-detected biometric characteristic information input by the individual user, identification may be verified, or access may be authorized, or other like resultant action may be undertaken.

The application of a single text string conversion scheme to each of several identifiable biometric characteristics for an individual user provides a flexibility that was previously unattainable. Conventional biometric identification systems are directed at optimizing identification of an individual user from analysis of a single biometric characteristic. In order to build a multi-modal system, a customer generally must deal with individual vendors for each of the individual modalities that the customer desires to integrate. For example, a customer may deal with one vendor to procure a fingerprint matcher, a second vendor to procure a face matcher, and a third vendor to procure an iris matcher. Rather than integrate these systems, the customer may simply operate in parallel each of the three separate, and proprietary, systems over one another in order to provide what the industry may refer to as multi-modal identification and/or access authorization. The principal reason for this non-optimal layering of individual systems is that individual vendors rarely design and construct their systems with an eye toward integration of those systems with systems from other vendors. Individual identification and/or access authorization systems may, for example, be comprised of separate and incompatible system architectures, operating system requirements, and data handling requirements, all provided under fairly rigid licensing agreements that the customers often have no choice but to accept. This combination of factors causes any attempt at useful integration of these conventional stovepipe systems to be complex, expensive, and data intensive (often requiring significant computing overhead).

The disclosed systems and methods substantially overcome these shortfalls by providing a common translation scheme for biometric characteristic data and essentially pushing the translation of biometric data off to the encoding phase of information processing. This provides for the use of commonly known, and well understood, text-based search engines. The search engines do not care to which specific biometric characteristic or modality the text string refer. Rather, the search engines simply execute a text-based search of strings of text data for comparison. Processing of individual text strings in this manner simplifies the search scheme in a manner that is scalable based on all of the data being converted to share a common backend. Performance improvements realized in application of the search engine will be equally realized, therefore, across all biometric characteristic identification modalities.

The above-described process for converting features extracted from received biometric characteristic information to text strings that are other than plain text descriptions of the features of the characteristics to provide formatted inputs to a searchable text-based database is unique. Text strings under the disclosed concepts may consist of sets of alpha-numeric characters that are provided in combinations that are generally unreadable by, or otherwise have no meaning as presented to, human readers. The text strings in numbers, letters and other characters provide merely a common language representation of the extracted biometric features that are not human readable in order to preserve privacy and security, but are machine-readable in a manner that allows an individual text string representing a biometric feature for an individual user who desires identification or access to be compared to a database of other text strings for previously-recorded biometric features of a user population that is identifiable or may be granted access authorization.

Figure 2:
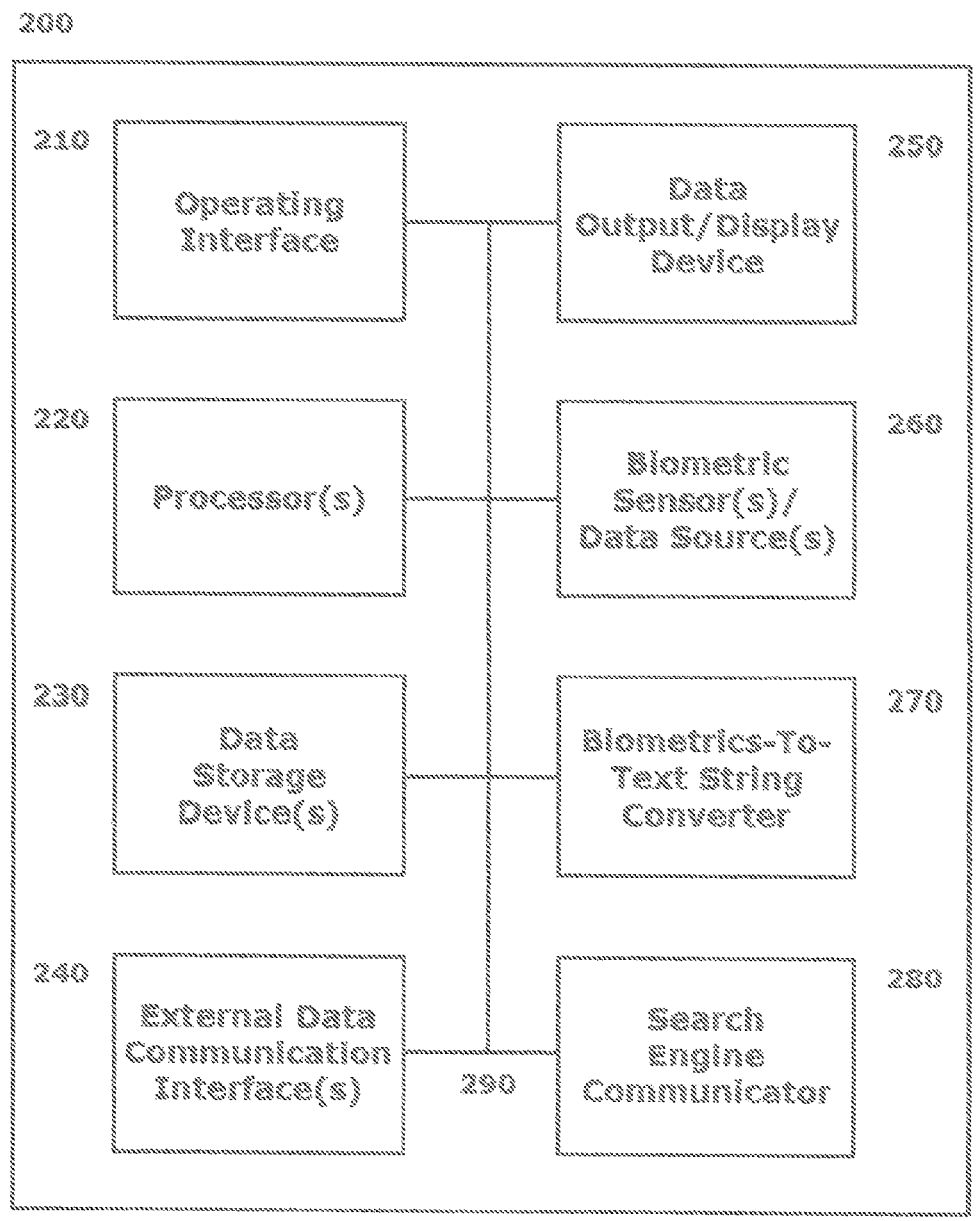
FIG. 2 illustrates a block diagram of an exemplary system for implementing a biometric identification scheme for security and/or access control according to this disclosure.

FIG. 2 illustrates a block diagram of an exemplary system 200 for implementing a biometric identification scheme for security and/or access control according to this disclosure. The exemplary system 200 shown in FIG. 2 may be provided in, for example, an access or identification station that may be embodied as: (1) an access device associated with a locked or otherwise secured entrance to a particular space, which may be located in the vicinity of, or otherwise directly adjacent to, the secured entrance; (2) a fixed or mobile user workstation, computing or communication device that may be protected by access control or identification features, or may be used to process and/or communicate access control or identification features, that are compatible with the biometric identification schemes according to this disclosure; (3) a locking system or device that may prevent operation of particular equipment until an identification of an individual user requesting operation of that particular equipment is "cleared;" and/or (4) other like identification and/or access control systems and devices. Otherwise, portions of the exemplary system 200 shown in FIG. 2 may be housed in a remote location apart from any particular access or identification station, such as a local or remote server (see local server 170 shown in FIG. 1).

The exemplary system 200 may include an operating interface 210 by which one or more individual users may communicate with the exemplary system 200. The operating interface 210 may be configured as one or more conventional mechanisms that permit an individual user to input information to the exemplary system 200. The operating interface 210 may include, for example, an integral or attached keyboard and/or mouse by which a user can enter data into the exemplary system 200. The operating interface 210 may alternatively include (1) a touchscreen with "soft" buttons, or for use with a compatible stylus; (2) a microphone by which a user may provide oral commands to the exemplary system 200 to be "translated" by a voice recognition program or otherwise; (3) a data reader such as, for example, an RFID chip reader, a barcode scanner or other like device, that may be capable of obtaining input information from an identification card, token, fob or other like device presented by the user in proximity to, or in contact with, the data reader; or (4) other like devices for individual user operation of, and/or data exchange with, the exemplary system 200.

The exemplary system 200 may include one or more local processors 220 for individually operating the exemplary system 200 and carrying out processing and control functions associated with the identification information collection function, the biometric identification information collection function, the biometric identification information conversion function, the data storage function, the data comparison function, and/or the individual user identification and access authorization functions described throughout this disclosure. Processor(s) 220 may include at least one conventional processor or microprocessor that interprets and executes instructions to execute the schemes, techniques, methods and/or algorithms associated with data conversion, and to make the appropriate determinations regarding individual user identification and/or access authorization according to the methods of this disclosure.

The exemplary system 200 may include one or more data storage devices 230. Such data storage devices 230 may be used to store data or operating programs to be used by the exemplary system 200, and specifically the processor 220. Data storage device(s) 230 may include a random access memory (RAM) or another type of dynamic storage device that stores information and instructions for execution by processor(s) 220. Data storage device(s) 230 may also include a read-only memory (ROM), which may include a conventional ROM device or another type of static storage device that stores static information and instructions for processor(s) 220. Further, the data storage devices 230 may be integral to the exemplary system 200, or may be provided external to, and in wired or wireless communication with, the exemplary system 200.

At least one of the data storage devices 230 may be particularly configured to host a database of identification information including biometric identification information that has been converted to non-human readable text strings and stored in conjunction with typical identification information for a particular user population. The data storage device 230 may be accessed to compare real-time acquired biometric identification data from an individual user requesting access that is itself converted to a text string and then compared using a text-based search engine, which may be locally housed as a function of, for example, the processor 220 or may be a remotely-stored application that is otherwise accessible to the exemplary system 200 via a search engine communicator 280.

The exemplary system 200 may include one or more external data communication interface(s) 240 by which the exemplary system 200 may communicate with components external to the exemplary system 200, directly or via a networked security environment such as that shown, for example, in FIG. 1. External data communication interface(s) 240 may include any mechanism that facilitates direct communication, or communication via a network environment, for the collection of data including biometric identification data from remote data sources or biometric data identification sensors. The external data communication interface(s) 240 may facilitate the sharing of, or the taking of other actions based on the results of the processing undertaken by the exemplary system 200. These downstream actions may include, for example, indicating identification of an individual user to a remote facility; allowing access of an authorized individual to particular data, a particular space, or a particular system or device; indicating to security personnel an attempted access by a non-authorized individual user to particular data or to a particular space; remotely unlocking physically locked spaces or equipment based on the determination that a requesting individual user is authorized access to the space; or other like actions. External data communication interfaces 240 may be appropriately configured and include such other mechanisms as may be appropriate for assisting in communications with other devices and/or systems over compatible data exchange connections.

The exemplary system 200 may include at least one data output/display device 250 which may be configured as one or more conventional mechanisms that output information to the individual user, including a display or one or more speakers for alerting the individual user to a resolved individual user identification or access authorization. The data output/display device 250 may separately be an output port for connection to a printer, a copier, a scanner, a multi-function device, or a remote storage medium, such as a memory in the form, for example, of a magnetic or optical disk with a corresponding disk drive.

The exemplary system 200 may include one or more biometric sensors and/or biometric data sources 260 by which the exemplary system 200 collects, gains access to, or is provided, biometric identification data regarding one or more individual users. The biometric sensors or biometric data sources 260 may include any commonly understood devices for gathering and providing biometric identification information to the exemplary system 200. A non-exhaustive list of such devices includes finger/thumb print scanners, iris/retina scanners, voice recorders, facial feature/body mass composition scanners, bodily fluid analyzers, imaging devices (including cameras, video recorders and the like), flatbed scanner devices used for reading hard-copy image information and forwarding it to the exemplary system 200, and other like devices. It should be understood that this list is non-exhaustive in that the terms "biometric sensors" and "biometric data sources" are intended as being generally inclusive regarding all sources by which raw and/or pre-processed biometric identification data may be provided to the exemplary system 200.

The exemplary system 200 may include a biometrics-to-text string converter 270. The biometrics-to-text string converter 270 may be a stand-alone device, or may be a function of the processor 220. The biometrics-to-text string converter 270 may be provided to extract particular features and/or feature templates from the biometric identification information received from the biometric sensors and/or biometric data sources 260 (the raw data being pre-processed and/or normalized as appropriate to provide input to the biometrics-to-text string converter 270). The extracted features and/or feature templates may then be converted to text strings according to the description of text strings provided above. Specifically, these text strings may be non-descriptive random combinations of alpha-numeric symbols that appropriately identify the extracted features and/or feature templates as simple database searchable inputs.

In an enrollment process, the biometrics-to-text string converter 270 may be used to facilitate the cataloging of individual database inputs such that identifying information regarding a particular user population may be captured and stored in one or more of the data storage devices 230. In an identification process, the biometrics-to-text string converter 270 may be used to convert the received biometric identification information from the one or more biometric sensors and/or biometric data sources 260 to a form that is compatible for using a locally-stored text-based search engine, or a remotely-accessible text-based search engine accessible via the search engine communicator 280 to search a previously-stored database of the identifying information regarding the user population that was captured and stored during the individual users' enrollment processes.

All of the various components of the exemplary system 200, as depicted in FIG. 2, may be connected by one or more data/control busses 290. These data/control busses 290 may provide wired or wireless communication between the various components of the exemplary system 200, whether all of those components are housed integrally in, or are otherwise external from and connected to, the exemplary system 200.

It should be appreciated that, although depicted in FIG. 2 as an integral unit, the various disclosed elements of the exemplary system 200 may be arranged in any combination of sub-systems as individual components or combinations of components, integral to a single unit, or external to, and in wired or wireless communication with the single unit of the exemplary system 200. In other words, no specific configuration as an integral unit or as a support unit is to be implied by the depiction in FIG. 2.

It should also be appreciated that the system storage and processing functions described above, given the proper manual, automatic, user-provided, system-recovered, or other inputs, may be carried out in system hardware circuits, through execution of software modules or instructions, or as firmware, or in varying combinations of these.

Figure 3:
FIG. 3 illustrates a flowchart of an exemplary method for implementing a biometric identification scheme for security and/or access control according to this disclosure.

The disclosed embodiments may include an exemplary method for implementing a biometric identification scheme for security and/or access control. FIG. 3 illustrates a flowchart of such an exemplary method. As shown in FIG. 3, operation of the method commences at Step S3000 and proceeds to Step S3100.

In Step S3100, identification information for one or more individuals in a particular user population may be acquired. The identification information may be textual and may be input by an individual user via a user interface associated with one or more access/identification stations. The identification information may include, for example, the individual user's name, address and/or phone number(s), government-issued identification numbers (including one's Social Security number, valid driver's license number, passport identification number, or other like identification number), date of birth, and/or descriptions of basic physical characteristic information including, for example, height, weight, hair color, eye color and/or identification of any distinguishing bodily marks. This identification information may be held temporarily in order to be associated with biometric identification information for the one or more individuals in the particular user population. Operation of the method proceeds to Step S3200.

In Step S3200, biometric identification information for the one or more individuals in the particular user population may be acquired. This biometric identification information may be obtained from one or more repositories of collected biometric identification information for particular classes of individual users. Access to these repositories to include copying of files including biometric identification information regarding any particular individual user will be according to prevailing laws governing such access. Information gathered from the repositories as it may pertain to a local user population may be locally stored for ready access and for executing the comparison and/or determination schemes discussed above. Accessing remote repositories to collect individual user biometric identification information may require the specific authorization of the individual user. The repositories may include biometric identification information that may have been previously collected and/or stored by one or more agencies, organizations, or entities that is identifiable as being associated with the textual identifying information provided by the individual user. Recovery and verification (by the system autonomously, or in conjunction with further user input) of previously collected and/or stored biometric information for the user may preclude a requirement for additional real-time collection of further biometric identification information on the individual user employing the one or more biometric sensors in real time. Otherwise, the individual user may be requested to provide biometric identification information and/or images via one or more biometric sensors. The biometric sensors may include any commonly-understood devices for gathering and providing biometric identification information. A non-exhaustive list of such devices includes finger/thumb print scanners, iris/retina scanners, voice recorders, facial feature/body mass composition scanners, bodily fluid analyzers, various imaging devices (including cameras, video recorders and the like), and other like devices. No particular limitation is implied to the manner by which the biometric identification information from the individual user may be acquired. In fact, the biometric sensors may not necessarily be sophisticated biometric sensors for real-time imaging of a particularly-identified biometric traits of the individual user in the general classes of such biometric sensors enumerated above, but rather may consist of no more than a flat plate image scanner by which the individual user may scan for upload images of pictures taken of the user, fingerprint images on a fingerprint card previously provided by the user, user writing sample(s) and the like. Operation of the method proceeds to Step S3300.

In Step S3300, acquired biometric identification information may be converted to individual text strings that remain representative of the acquired biometric identification information. The individual text strings may be combinations of letters, numbers and symbols that do not together form individual words that may be interpreted by human. The individual text strings are not intended to provide human-readable descriptions of the acquired biometric identification information that they represent. This characteristic improves security of the data representing the individual users' biometric identification information. The text strings are simply intended to provide sortable text strings that can be employed by any text-based search engine for comparison. Operation of the method proceeds to Step S3400.

In Step S3400, the individual text strings representing the converted biometric identification information may be stored. The storage may include associating with the converted biometric identification information one or more of the elements of the obtained identification information for the individual users. Operation of the method proceeds to Step S3500.

In Step S3500, an identification or access request may be received from an individual. The identification or access request may include imaging of one or more biometric characteristics of the individual according to an availability of one or more real-time biometric identification information sensors. Operation of the method proceeds to Step S3600.

In Step S3600, the image of the one or more biometric characteristics of the individual associated with the identification or access request may be converted to an access request text string. Operation of the method proceeds to Step S3700.

In Step S3700, the access request text string may be compared to the stored database of individual text strings to find a stored text string that corresponds to the access request text string. Operation of the method proceeds to Step S3800.

In Step S3800, a rank-ordered list of stored individual text strings that are determined to closely match the access request text string may be output for assessment by, for example, a comparator process prior to granting or denying the requested access. Operation of the method proceeds to Step S3900.

In Step S3900, a determination may be made that the access request string matches one or more of the stored individual text strings according to, for example, a specified threshold, or a pre-determined minimum deviation between the access request text string and the stored individual text strings that are determined to be close to the access request text string. Operation of the method proceeds to Step S4000.

In Step S4000, one or more actions based on the determination may be undertaken by the system executing the method. As a concrete example of those actions, physical access may be granted (or denied) as appropriate based on the individual's access request and favorable (or non-favorable) results of the determination. Operation of the method proceeds to Step S4100, where operation of the method ceases.

The disclosed embodiments may include a non-transitory computer-readable medium storing instructions which, when executed by a processor, may cause the processor to execute some or all of the steps of the exemplary method, as outlined above.

The above-described exemplary system and method reference certain conventional components and known biometric identification information collection and comparison techniques to provide a brief, general description of a suitable scheme in which the subject matter of this disclosure may be implemented for familiarity and ease of understanding. As indicated above, although not required, embodiments of the data collection, conversion, reporting and control functions according to the disclosure may be provided, at least in part, in a form of hardware circuits, firmware or software computer-executable instructions to carry out the specific functions described, such as with program modules being executed by a processor. Generally, program modules in this context include routine programs, data objects, software components, data structures, and the like that perform particular tasks (functions) or implement particular data types.

Those skilled in the art will appreciate that other embodiments of the disclosed subject matter may be practiced with many types and configurations of identification and access authorization systems, devices, equipment and/or supporting structures.

The exemplary depicted sequence of executable instructions or associated data structures represents one example of a corresponding sequence of acts for implementing the functions described in the steps. No specific order is to be implied by the depiction presented in FIG. 3 and the accompanying description except where a specific method step may be considered a necessary pre-condition to execution of any other method step.

Although the above description may contain specific details, they should not be construed as limiting the claims in any way. Other configurations of the described embodiments of the disclosed systems and methods are part of the scope of this disclosure. For example, the principles of the disclosure may be applied to each individual user where each user may individually attempt to be identified or to have some level of access granted according to the disclosed systems and methods. This enables each individual user to separately employ and/or exploit the benefits of the disclosure. There may be multiple instances of the components, each processing biometric identification information for one or more individual users in a specified user population in a variety of possible ways. It does not necessarily need to be one identical embodiment of the disclosed system used by all end individual users during any form of an initial enrollment process or later in an identification and/or access authorization request process. Accordingly, the appended claims and their legal equivalents should only define the disclosure, rather than any specific examples given.

We claim:

1. A method for identifying an individual, comprising:
   receiving, with a processor, a request for identification of an individual, the request for identification including first input biometric identification information for the individual from one or more biometric identification information imagers;
   converting, with the processor, the first input biometric identification information for the individual to an individual identification text string;
   establishing a threshold criteria for comparing the individual identification text string to a plurality of previously-stored text strings representing biometric identification information for a population of identifiable individuals;
   comparing, with the processor, the individual identification text string to the plurality of previously-stored text strings representing the biometric identification information for members of the population of identifiable individuals; and
   outputting results of the comparing to identify whether the individual is a member of the population of identifiable individuals, the output results (1) including only those results of the comparing that meet the established threshold criteria, and (2) being presented as a rank-ordered list derived from the population of identifiable individuals based on text strings from the plurality of stored text strings being determined to be substantially equivalent to the individual identification text string according to the established threshold criteria.

2. The method of claim 1, further comprising:
   receiving, with the processor, a request from the individual to be enrolled as a member of the population of identifiable individuals;
   receiving, with the processor, basic textual identification information identifying the individual;
   collecting, with the processor, available biometric identification information for the individual from one or more biometric identification information data sources;
   converting, with the processor, the collected biometric identification information for the individual to one or more text strings; and
   storing the one or more text strings in association with the basic textual identification information for the individual as one or more of the plurality of stored text strings representing the biometric identification information for the population of identifiable individuals.

3. The method of claim 2, the collecting the available biometric identification information for the individual from the one or more biometric identification information data sources comprising:
   searching a plurality of databases or data sources to identify available biometric identification information regarding the individual using the basic textual identification information provided by the individual as a search criteria; and
   copying the identified biometric identification information regarding the individual as the collected biometric identification information for the individual.

4. The method of claim 2, the collecting the available biometric identification information for the individual from one or more biometric identification information data sources comprising receiving, with the processor, second input biometric identification information for the individual from the one or more of the biometric identification information imagers.

5. The method of claim 1, the one or more biometric identification information imagers comprising at least one of a finger print scanner, a thumb print scanner, an iris scanner, a retina scanner, a voice recorder, facial feature scanner, a body mass composition scanner, a bodily fluid analyzer, a camera and a video recorder.

6. The method of claim 1, the one or more biometric identification information imagers comprising an image scanner for scanning for upload images of at least one of pictures of the individual, fingerprint images of the individual and writing samples of the individual.

7. The method of claim 1, the request for identification of the individual comprising a request for access to one of secured data, a secured space or secured equipment, the comparing determining that the individual is identified as a member of the population of identifiable individuals, the method further comprising granting the individual access to the one of the secured data, the secured space, or the secured equipment.

8. The method of claim 7, the granting the individual access to the secured space comprising the processor sending a signal to physically unlock the secured space.

9. The method of claim 1, the individual identification text string and the plurality of stored text strings comprising combinations of at least one of numbers, letters and symbols that are arranged by the processor in a format other than forming human recognizable words.

10. A system for identifying an individual, comprising:
    an operating interface via which a user requests identification of an individual via the system;
    a biometric identification information imager that images at least one first input biometric identifier for the individual in support of the identification request;
    a biometric information converter that converts the at least one first input biometric identifier for the individual to an individual identification text string;
    a data storage device that stores (1) a plurality of previously-stored text strings representing biometric identification information for a population of identifiable individuals, and (2) an established threshold criteria for comparing the individual identification text string to the plurality of previously-stored text strings;
    a text-based search engine that compares the individual identification text string to the plurality of previously-stored text strings representing the biometric identification information for members of the population of identifiable individuals; and
    an output device that executes an action based on results of the comparing when the comparing identifies whether the individual is a member of the population of identifiable individuals, the output device displaying results of the comparing that meet the established threshold criteria presented as a rank-ordered list derived from the population of identifiable individuals based on text strings from the plurality of stored text strings being determined to be substantially equivalent to the individual identification text string according to the established threshold criteria.

11. The system of claim 10, further comprising a biometric information processor that (1) receives a request for an individual to be enrolled as a member of the population of identifiable individuals, (2) receives basic textual identification information identifying the individual, (3) collects available biometric identification information for the individual from one or more biometric identification information data sources, (4) converts the collected biometric identification information for the individual to one or more text strings; and (5) stores the one or more text strings in association with the basic textual identification information for the individual in the data storage device as one or more of the plurality of stored text strings representing the biometric identification information for the members of the population of identifiable individuals.

12. The system of claim 11, the biometric information processor collecting the available biometric identification information for the individual from one or more biometric identification information data sources by (1) searching a plurality of databases or data sources to identify available biometric identification information regarding the individual using the basic textual identification information provided by the individual as a search criteria; and (2) copying the identified biometric identification information regarding the individual as the collected biometric identification information for the individual.

13. The system of claim 11, the biometric information processor collecting the available biometric identification information for the individual from the biometric identification information imager as second input biometric identification information.

14. The system of claim 10, the biometric identification information imager comprising at least one of a finger print scanner, a thumb print scanner, an iris scanner, a retina scanner, a voice recorder, facial feature scanner, a body mass composition scanner, a bodily fluid analyzer, a camera or a video recorder.

15. The system of claim 10, the biometric identification information imager comprising an image scanner for scanning for upload images of at least one of pictures of the individual, fingerprint images of the individual, and writing samples of the individual.

16. The system of claim 10, the request for identification to the system including a request for access to one of secured data, a secured space or secured equipment, the result of the comparing determining that the individual is identified as a member of the population of identifiable individuals, the biometric information processor granting the individual access to the one of the secured data, the secured space, or the secured equipment.

17. The system of claim 16, the biometric information processor sending a signal to physically unlock the secured space.

18. The system of claim 10, the individual identification text string and the plurality of stored text strings comprising combinations of at least one of numbers, letters and symbols that are arranged by the biometric information converter in a format other than forming human recognizable words.

19. A non-transitory computer readable medium on which is stored instructions that, when executed by a processor, cause the processor to perform the steps of a method for identifying an individual, the method comprising:
  receiving a request for identification of an individual, the request for identification including input biometric identification information for the individual from one or more;
  converting the input biometric identification information for the individual to an individual identification text string;
  establishing a threshold criteria for comparing the individual identification text string to a plurality of previously-stored text strings representing biometric identification information for members of a population of identifiable individuals;
  comparing the individual identification text string to the plurality of stored previously-stored text strings representing biometric identification information members of the population of identifiable individuals; and
  outputting results of the comparing to identify whether the individual is a member of the population of identifiable individuals, the output results (1) including only those results of the comparing that meet the established threshold criteria, and (2) being presented as a rank-ordered list derived from the population of identifiable individuals based on text strings from the plurality of stored text strings being determined to be substantially equivalent to the individual identification text string according to the established threshold criteria.

* * * * *